US007710870B2

(12) United States Patent
Lee et al.

(10) Patent No.: US 7,710,870 B2
(45) Date of Patent: May 4, 2010

(54) METHOD AND APPARATUS FOR CONTROLLING CONGESTION OF NODES IN AD-HOC NETWORK

(75) Inventors: Kang Yong Lee, Daejeon (KR); Seong Soon Joo, Daejeon (KR); Jeong Dong Ryoo, Daejeon (KR); Kee Seong Cho, Daejeon (KR); Byung Sun Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 406 days.

(21) Appl. No.: 11/743,646

(22) Filed: May 2, 2007

(65) Prior Publication Data

US 2008/0062867 A1 Mar. 13, 2008

(30) Foreign Application Priority Data

Sep. 29, 2006 (KR) .................. 10-2006-0096603
Nov. 7, 2006 (KR) .................. 10-2006-0109710

(51) Int. Cl.
*G01R 31/08* (2006.01)
*H04L 12/413* (2006.01)
*H04J 3/16* (2006.01)

(52) U.S. Cl. ............... 370/229; 370/235; 370/445; 370/468

(58) Field of Classification Search .......... 370/230, 370/229, 445, 447, 342, 337–338, 468, 235
See application file for complete search history.

(56) References Cited

U.S. PATENT DOCUMENTS 7,006,476 B1 * 2/2006 Tateishi ............... 370/337
7,280,517 B2 * 10/2007 Benveniste ............ 370/338
7,305,464 B2 * 12/2007 Phillipi et al. .......... 709/223

7,352,770 B1 * 4/2008 Yonge et al. ........... 370/445

(Continued)

FOREIGN PATENT DOCUMENTS

KR    1020060010019 A    2/2006

OTHER PUBLICATIONS

Sunghyun Choi, Javier del Prado, Sai Shankar, Stefan Mangold, IEEE 802.11e Contention-Based Channel Access (EDCF) Performance Evaluation, Aug. 30, 2006 (Internet), p. 1.*

(Continued)

*Primary Examiner*—Kwang B Yao
*Assistant Examiner*—Candal Elpenord

(57) ABSTRACT

Provided is a method and apparatus for controlling congestion of a node in an ad-hoc network comprising: classifying a channel state into a busy channel state and an idle channel state and then monitoring the channel state; performing contention for acquiring a channel with neighboring nodes when data to be transmitted is present during the monitoring of the channel state; calculating an available bandwidth on the basis of the channel state when wins the contention; and determining the amount of data to be transmitted on the basis of the available bandwidth. The nodes in the ah-hoc network monitor their own wireless channel state so as to obtain channel contention information, calculate an available bandwidth from the channel contention information, and control a transmission amount on the basis of the available bandwidth. Accordingly, the nodes can avoid excessive traffic which exceeds channel capacity. Channel contention, which is the most immediate and important cause of a decrease in network performance, can be loosened.

15 Claims, 5 Drawing Sheets

U.S. PATENT DOCUMENTS

| | | | |
|---|---|---|---|
| 7,477,621 B1* | 1/2009 | Loc et al. | 370/329 |
| 2005/0052995 A1* | 3/2005 | Gu et al. | 370/230 |
| 2005/0111423 A1* | 5/2005 | Anderson et al. | 370/341 |
| 2005/0272423 A1* | 12/2005 | Stephens et al. | 455/434 |
| 2005/0276276 A1* | 12/2005 | Davis | 370/447 |
| 2006/0092910 A1* | 5/2006 | Dertz et al. | 370/348 |
| 2006/0176896 A1* | 8/2006 | Callaway et al. | 370/437 |
| 2006/0215574 A1* | 9/2006 | Padmanabhan et al. | 370/252 |
| 2007/0060158 A1* | 3/2007 | Medepalli et al. | 455/450 |
| 2007/0076742 A1* | 4/2007 | Du et al. | 370/445 |
| 2007/0263654 A1* | 11/2007 | Salokannel et al. | 370/448 |

OTHER PUBLICATIONS

Sundaresan, K. et al., "ATP: A Reliable Transport Protocol for Ad Hoc Networks", IEEE Transactions on Mobile Computing, 4(6): 588-603 (Nov./Dec. 2005).

Lee, K. et al., "CAT: Contention Aware Transport Protocol for IEEE 802.11 MANETs", The 63rd IEEE Vehicular Technology Conference, VTC2006-Spring, Melbourne, Australia, May 7-May 10, 2006, 6 pages.

* cited by examiner

METHOD AND APPARATUS FOR CONTROLLING CONGESTION OF NODES IN AD-HOC NETWORK

CROSS-REFERENCE TO RELATED PATENT APPLICATION

This application claims the benefit of Korean Patent Application No. 10-2006-0109710, filed on Nov. 7, 2006, in the Korean Intellectual Property Office, the disclosure of which is incorporated herein in its entirety by reference.

BACKGROUND OF THE INVENTION

1. Field of the Invention

The present invention relates to a method and apparatus for efficiently controlling congestion of nodes in a wireless mobile ad-hoc network (hereinafter, referred to as an "ad-hoc network") to which much attention has been given as a networking technology in a ubiquitous environment due to the development of wireless connectivity and mobile technology.

2. Description of the Related Art

At present, there is no standard media access method dedicated to an ad-hoc network. Therefore, the IEEE 802.11 MAC protocol is generally used as a media access method in ad-hoc networks. A transmission control protocol (TCP) is widely used as a transmission protocol in ad-hoc networks.

The TCP is a standard transmission protocol which is the most widely used Internet protocol. The TCP has been proposed for reliable data transmission and efficient congestion control in cable networks. The TCP provides a method of controlling congestion based on a congestion window by taking into consideration a round-trip time (RTT) which is a packet round-trip time between a transmission node (sometimes, referred to as a source node) and a reception node (sometimes, referred to as a destination node).

When initial data transmission is smoothly achieved, the transmission amount is increased gradually while increasing the size of the congestion window. However, if packet loss occurs, congestion is assumed to occur at an intermediate node on a path between the transmission node and the reception node. Therefore, the size of the congestion window is decreased rapidly at a TCP transmitter side (an additive-increase-multiplicative-decrease (AIMD)

In the cable network, which has a reliable transmission network, the method of controlling congestion in the TCP is superior. However, in the ad-hoc network, in which the reason for the packet loss is fundamentally different from that of the cable network, performance is remarkable decreased. In the ad-hoc network, much of the packet loss is caused due to channel contention which is caused by excessive traffic that exceeds channel capacity.

In the ad-hoc network, in which the reason for the pack loss is different from that of the cable network, there is a limit to the amount by which the performance can be improved by the conventional method of controlling congestion in the TCP. Accordingly, a new method of controlling congestion for only the ad-hoc network is necessary.

An example of a conventional method of controlling congestion in the ad-hoc network is a method of restricting the size of the congestion window in the TCP using the number of hops between the transmission node and the reception node. The conventional AIMD method of controlling congestion in the TCP generates temporary excessive traffic in the ad-hoc network so as to cause serious packet loss. Therefore, this method has been proposed to decrease traffic burstness by restricting the maximum size of the congestion window to a reasonable level. In this method, since the size of the congestion window is restricted to one quarter of the number of hops between the transmission node and the reception node, traffic overload can be avoided. Accordingly, the packet loss can be significantly decreased. However, the restriction in the size of the congestion window lowers the throughput of nodes, so that the overall performance in the network is lowered.

As another example of the conventional method of controlling congestion in the ad-hoc network, there is a method of controlling congestion by taking into consideration a path failure which can occur due to nodes having mobility. In other words, when the packet loss occurs due to path failure, the data transmission is interrupted so that path recovery can be performed. After the path recovery is achieved, the transmission node restarts the data transmission to prevent possible packet loss during the path recovery. This method provides a solution to the path failure by taking into consideration the mobility of nodes in the ad-hoc network. However, the fundamental cause of the packet loss has not been taken into consideration.

Another example of a conventional method of controlling congestion in the ad-hoc network is a method of adaptively controlling congestion by classifying the packet loss that occurs in the ad-hoc network according to the cause of the packet loss. In other words, the packet loss is classified into packet loss due to path failure, packet loss due to physical errors caused by wireless media, and packet loss due to excessive traffic. The method of controlling congestion is applied differently depending on the cause. This method not only spends a long time finding the cause of the packet loss but it also is difficult to accurately find the cause. Therefore, this method is in danger of misjudging the cause, and a long time is required to control congestion.

Another example of a conventional method of controlling congestion in the ad-hoc network is a method of controlling congestion using transmission amount-based control (sometimes, referred to as a rate-based control), which is different to the congestion window-based control provided by the TCP. Unlike the conventional method of controlling congestion based on the congestion window, this method can avoid traffic overload to loosen the channel contention. However, since control of the transmission amount is performed on the basis of the RTT between the transmission node and the reception node, the overall throughput in the network may decrease.

As described above, the methods of controlling congestion proposed for the ad-hoc network do not take into consideration the channel contention which is the most immediate and important cause of packet loss.

SUMMARY OF THE INVENTION

The present invention provides a method and apparatus for loosening channel contention by calculating available bandwidths of nodes using channel contention information in an ad-hoc network and controlling transmission amounts according to the available bandwidths.

According to an aspect of the present invention, there is provided a method of controlling congestion of a node in an ad-hoc network comprising: classifying a channel state into a busy channel state and an idle channel state and then monitoring the channel state; performing contention for acquiring a channel with neighboring nodes when data to be transmitted is present during the monitoring; calculating an available bandwidth on the basis of the channel state when wins at the contention; and determining an amount of data to be transmitted on the basis of the available bandwidth.

According to another aspect of the present invention, there is provided an apparatus for controlling congestion of a node in an ad-hoc network comprising: a monitoring unit which classifies a channel state into a busy channel state and an idle channel state and then monitors the channel state; a channel contending unit which performs contention for acquiring a channel with neighboring nodes when data to be transmitted is present during the monitoring; a bandwidth calculating unit which calculates an available bandwidth on the basis of the channel state when wins at the contention; and a determining unit which determines the amount of data to be transmitted on the basis of the available bandwidth.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, exemplary embodiments of the present invention are described in detail with reference to the attached drawings. For the convenience of description, a method and an apparatus are illustrated together.

Figure 1:
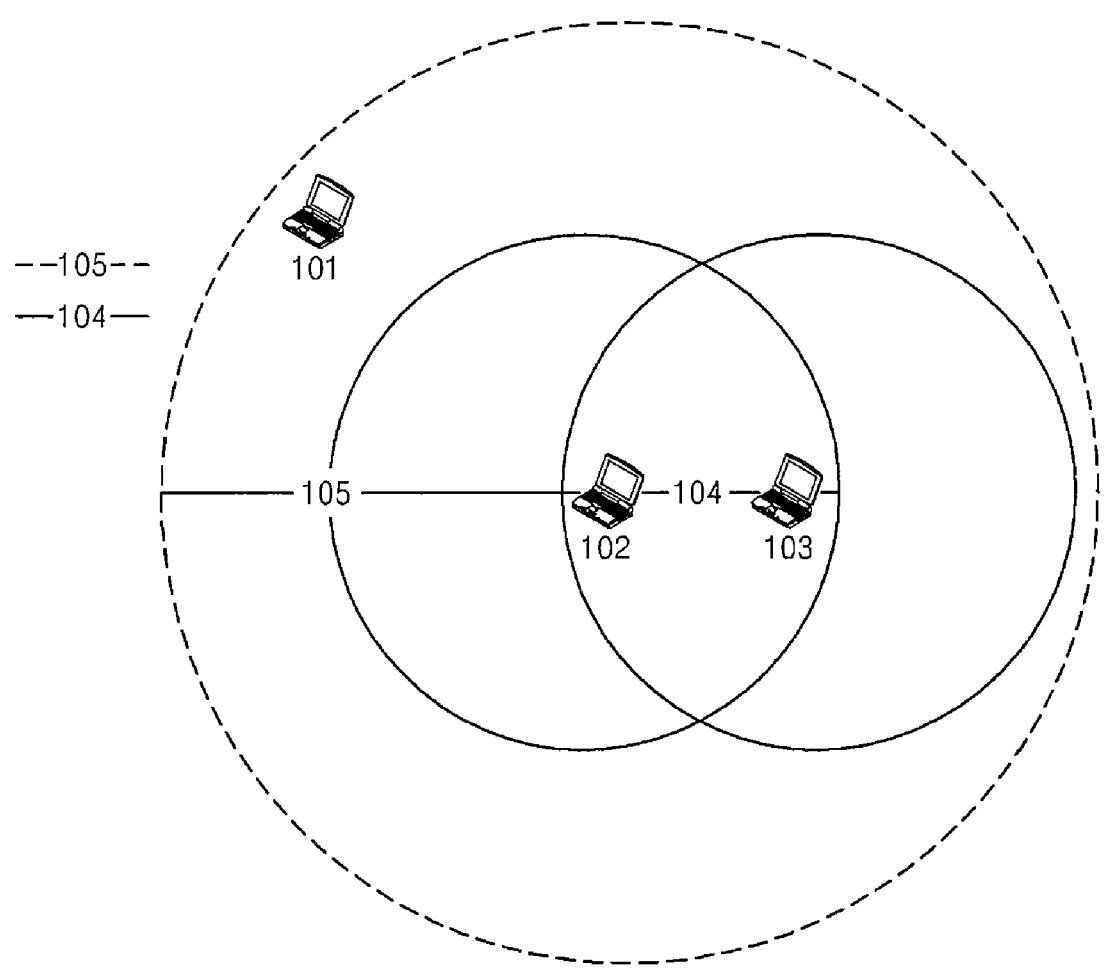
FIG. 1 is a view showing a construction of a wireless mobile ad-hoc network employing an embodiment of the present invention.
Figure 2:
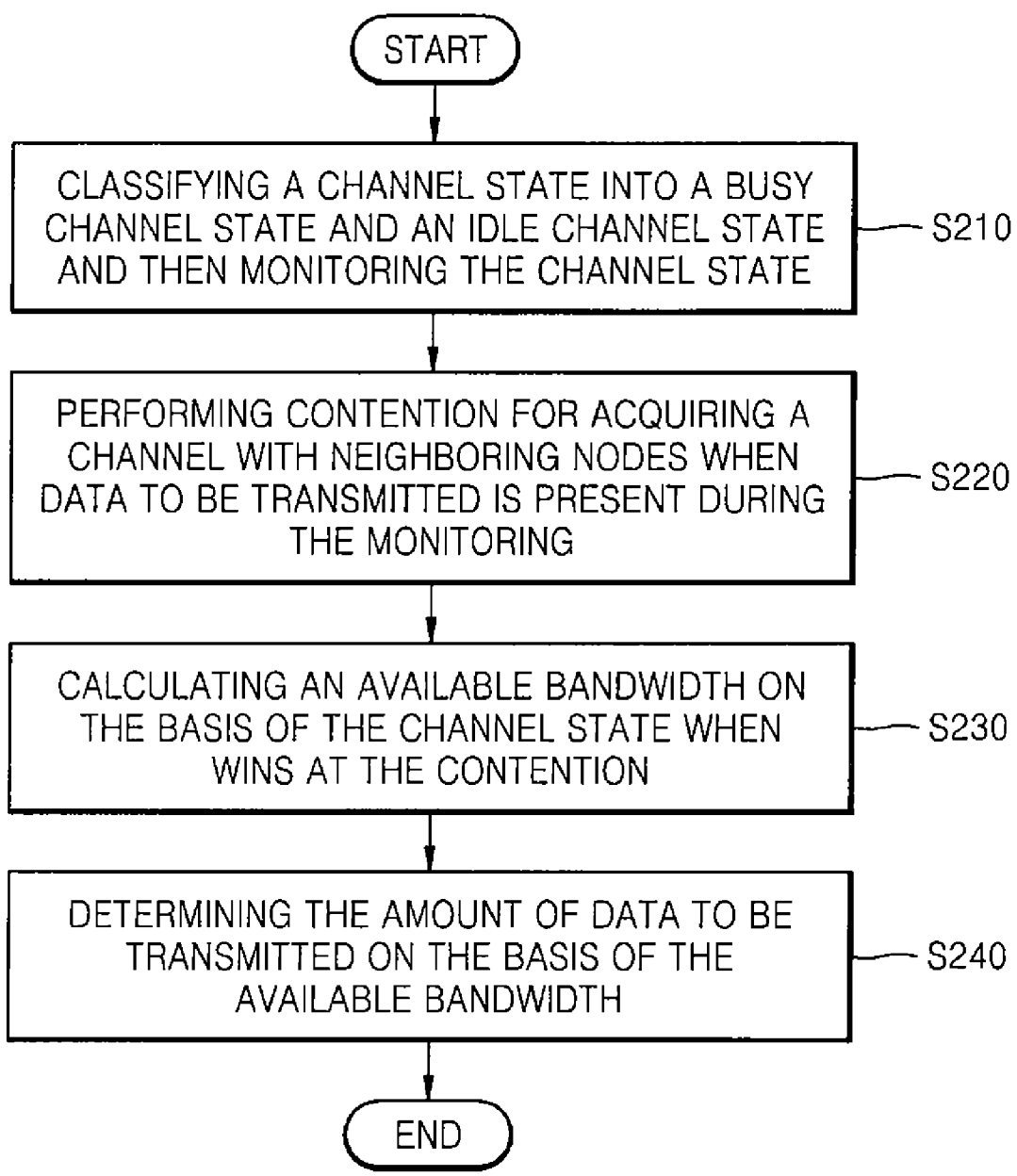
FIG. 2 is a flowchart of a method of controlling congestion of nodes in an ad-hoc network according to an embodiment of the present invention.
Figure 3:
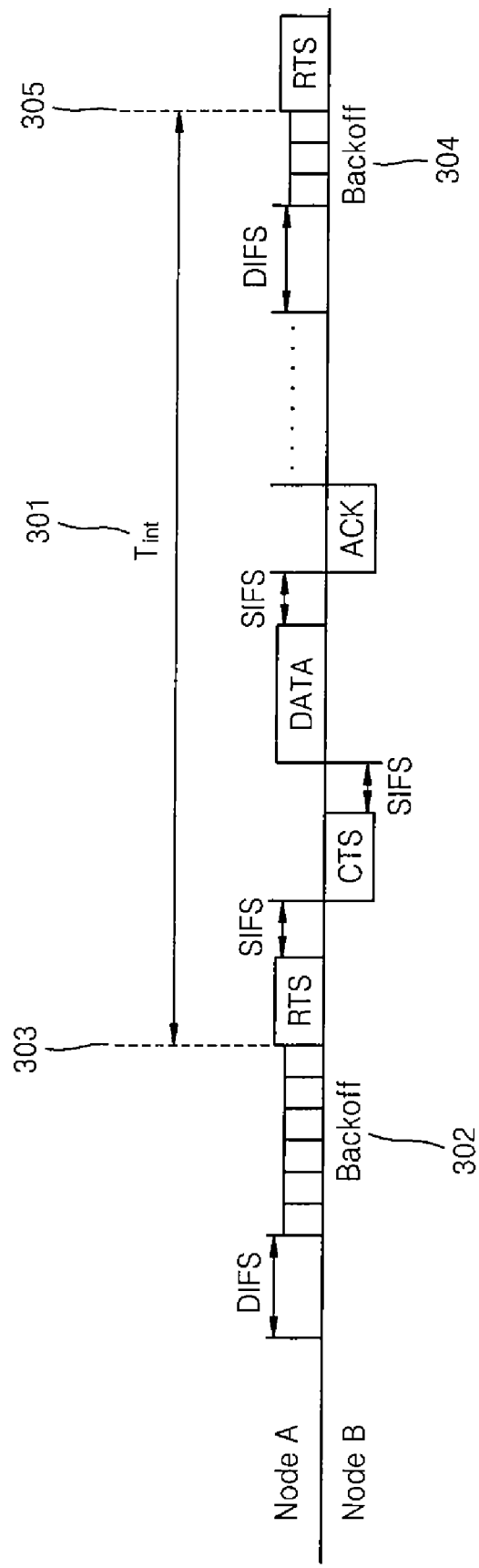
FIG. 3 is a view showing time-varying states of channels in the IEEE 802.11 MAC protocol according to an embodiment of the present invention.
Figure 4:
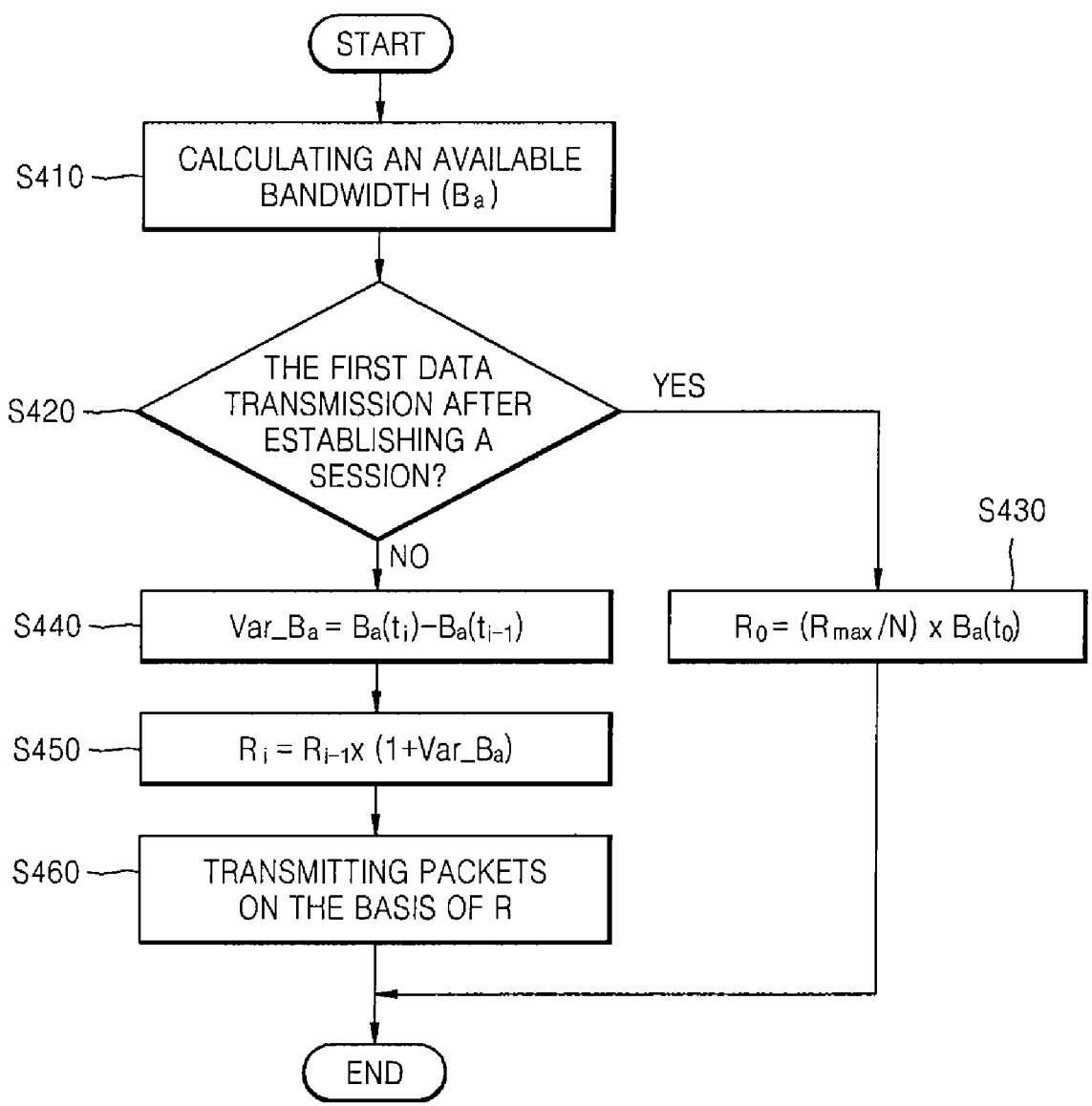
FIG. 4 is a flowchart showing a process of controlling transmission amounts based on available bandwidths of each node in an ad-hoc network according to an embodiment of the present invention.
Figure 5:
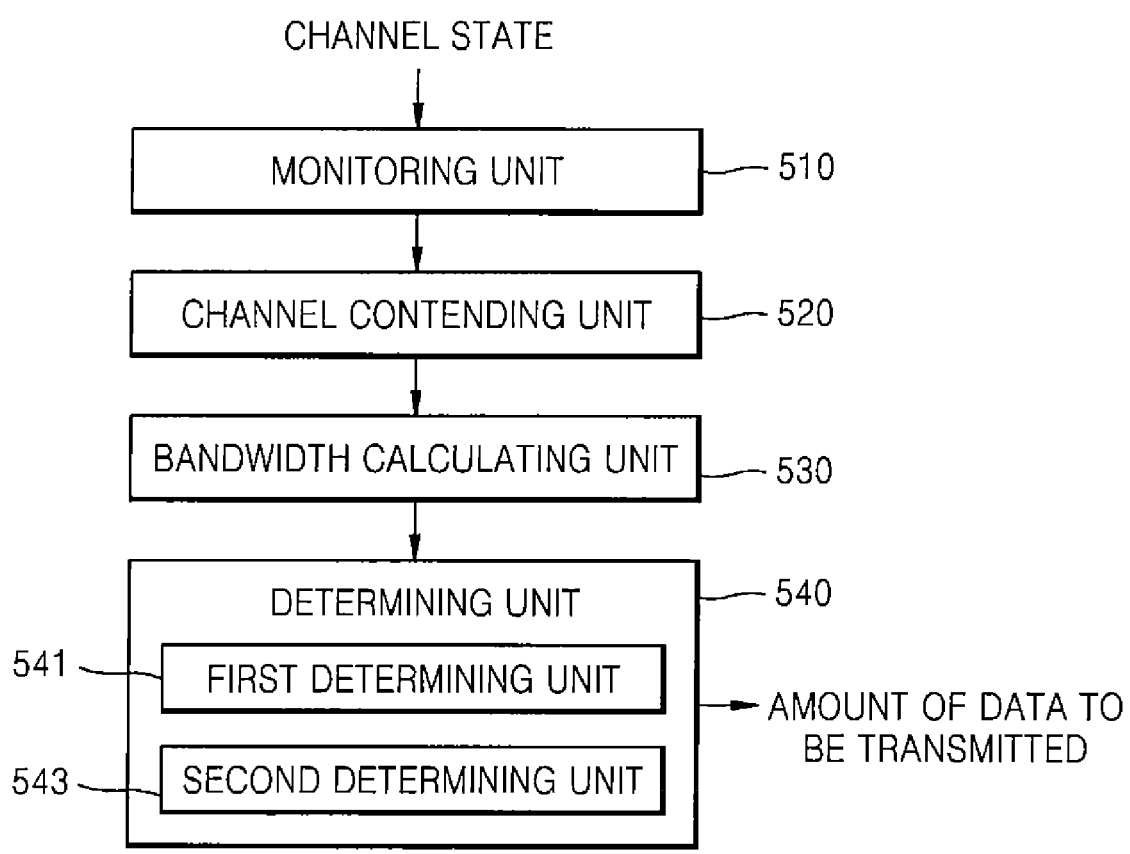
FIG. 5 is a block diagram showing a construction of an apparatus for controlling congestion of nodes in an ad-hoc network according to an embodiment of the present invention.

FIG. 1 is a view showing a construction of a wireless mobile ad-hoc network employing the present invention. FIG. 2 is a flowchart of a method of controlling congestion of nodes in an ad-hoc network according to an embodiment of the present invention. FIG. 3 is a view showing time-varying states of channels in the IEEE 802.11 MAC protocol according to an embodiment of the present invention. FIG. 4 is a flowchart showing a process of controlling transmission amounts based on available bandwidths of each node in an ad-hoc network according to an embodiment of the present invention. FIG. 5 is a block diagram showing a construction of an apparatus for controlling congestion of nodes in an ad-hoc network according to an embodiment of the present invention.

An ad-hoc network employing an embodiment of the present invention is described with reference to FIG. 1. Nodes participating in the ad-hoc network use the IEEE 802.11 MAC protocol based on Carrier Sense Multiple Access/Collision Avoidance (CSMA/CA) as a media access protocol in an embodiment of the present invention. The nodes which use the IEEE 802.11 MAC protocol have two wireless channel ranges. A transmission range 104 denotes a maximum distance within which a node can transmit data. That is, a reception node 103 located within the transmission range of a transmission node 102 can receive and analyze data sent by the transmission node 102 accurately. A signal detection range 105 denotes a maximum range within which a node can detect a signal. That is, a node 101 located within the signal detection range 105 of the transmission node 102 can detect a signal sent by the transmission node 102. However, since the signal intensity is too weak, the node 101 cannot analyze the data accurately. The IEEE 802.11 MAC protocol is generally set so that the signal detection range is about two times wider than the transmission range.

A monitoring unit 510 as shown in FIG. 5 classifies a channel state into a busy channel state and an idle channel state and then monitors the channel state. A wireless channel state of the node is defined as the busy channel state when a node is in one of the states in the group consisting of a state in which a node is sending or receiving packets, a state in which channel access is delayed by a Request to Send (RTS) or a Clear To Send (CTS) (the time by which channel access is delayed by a network allocation vector), and a state in which a node located in a signal detection range of another node cannot accurately analyze a signal, so that channel access is delayed by an extended inter frame space (EIFS).

When the channel state is not in the busy channel state, the channel state is defined as the idle channel state. The channel state is monitored periodically on the basis of a watch period. In an embodiment of the present invention, the watch period ($T_{int}$) 301 as shown in FIG. 3 is defined as an interval between an instant 303 at which a node acquires a channel during a backoff contention phase 302 so as to start RTS transmission and an instant at which after finishing the data transmission, the node acquires the next channel during another backoff contention phase 304.

A channel contending unit 520 performs contention for acquiring a channel with neighboring nodes when data that is to be transmitted is present during the monitoring (as illustrated in FIG. 2) in operation S220. After winning the contention for acquiring a channel with neighboring nodes, a bandwidth calculating unit 530 calculates its own available bandwidth using the obtained busy channel state information and idle channel state information as shown in Equation 1 in operation S230.

$$Ba = 1 - \left(\frac{Tb}{Tv}\right) \qquad \text{[Equation 1]}$$

Where Ba is an available bandwidth, Tv is a watch period, and Tb is the time which the channel state of the node has been in the busy channel state during Tv. The available bandwidth of a specific node signifies a ratio of an idle channel that the node can have to the overall channel, that is, the channel bandwidth which can be used for data transmission.

A determining unit 540 includes a first determining unit 541 and a second determining unit 543. The determining unit 540 determines the amount of data to be transmitted on the basis of the available bandwidth calculated by the bandwidth calculating unit 530 in operation S240. When data transmission is the first data transmission after establishing a session, the first determining unit 541 determines an initial transmission amount by dividing a maximum transmission amount at the physical layer by the number of sessions that the node establishes and then multiplying by the available bandwidth. When data transmission is not the first data transmission after establishing a session, the second determining unit 542 determines a variation in the available bandwidths by comparing the present available bandwidth with an available bandwidth just prior to the present available bandwidth. If the variation in the available bandwidths is greater than 0, the transmission amount is increased by as much as the variation increases. If the variation in the available bandwidths is less than 0, the transmission amount is decreased by as much as the variation decreases.

Operations of the determining unit 540 will now be described in more detail with reference to FIG. 4. The node which wants authority to access a channel so as to send a packet calculates its own available bandwidth Ba as described above in operation S410. It is determined whether or not data transmission is the first data transmission after establishing a session in operation S420. If the result is yes, an initial transmission amount $R_0$ is calculated. The calculation of the initial transmission amount is based on a maximum transmission amount $R_{max}$ at the physical layer which the node uses. Where $R_{max}$ denotes a theoretical maximum transmission amount which the node can have. In the ad-hoc network, since an individual node serves as a router, one node may establish several sessions. Accordingly, fairness between the sessions is taken into consideration by dividing $R_{max}$ by the number N of the sessions that the node establishes presently. Then the initial transmission amount $R_0$ is determined by multiplying the result of the division by the available bandwidth which signifies a ratio of an idle channel to the overall channel in operation S430. In the present embodiment, a time when the initial transmission amount is determined after establishing a session is represented by $t_0$.

If the data transmission is not the first data transmission after establishing a session, that is, the transmission amount corresponding to the session is already present, a new transmission amount is determined on the basis of the existing transmission amount. This time is represented by $t_i$, and the time prior to the time $t_i$ is represented by $t_{i-1}$.

An amount of variation Var_$B_a$ in the available bandwidths is determined by comparing the present available bandwidth $B_a(t_i)$ which is newly obtained with an available bandwidth $B_a(t_{i-1})$ just prior to the present available bandwidth in operation S440. A new transmission amount $R_i$ is determined on the basis of the transmission amount $R_{i-1}$ just prior to the $R_i$ Specifically, if the present available bandwidth is increased compared to the available bandwidth just prior to the present available bandwidth, that is, the amount of variation in the available bandwidths is greater than 0, the transmission amount is increased by as much as the variation increases. If the present available bandwidth is decreased compared to the available bandwidth just prior to the present available bandwidth, that is, the amount of variation in the available bandwidths is less than 0, the transmission amount is decreased by as much as the variation decreases in operation S450.

Packets are transmitted on the basis of the transmission amount determined by the method described above in operation S460. These operations are repeated until the session is finished.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

As described above, in a method and apparatus for controlling congestion of nodes in an ad-hoc network according to the present invention, the congestion is controlled by taking into consideration channel contention in the ad-hoc network in which the IEEE 802.11 MAC protocol is used as a media access method. The nodes in the ah-hoc network monitor their own wireless channel state so as to obtain channel contention information, calculate an available bandwidth from the channel contention information, and control a transmission amount on the basis of the available bandwidth. Accordingly, the nodes can avoid excessive traffic which exceeds channel capacity. Channel contention, which is the most immediate and important cause of a decrease in network performance, can be loosened. As a result, in data transmission using nodes, packet loss due to channel contention decreases, and the throughput is highly increased. In addition, since the packet loss decreases, an attempt to retransmit data in the nodes also naturally decreases. Therefore, in the ad-hoc network which is constructed using terminals operated by a battery, the present invention has the merit of saving resources.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of controlling congestion of a node in an ad-hoc network, the method comprising:
    (a) classifying a channel state into a busy channel state or an idle channel state and then monitoring the channel state;
    (b) performing contention for acquiring a channel with neighboring nodes when data to be transmitted is present during the monitoring of the channel state;
    (c) calculating an available bandwidth on the basis of the channel state when the node wins the contention; and
    (d) determining an amount of data to be transmitted on the basis of the available bandwidth,
    wherein (d) comprises
    (d1) determining whether or not data transmission is a first data transmission after establishing a session,
    (d2) if the data transmission is the first data transmission after establishing a session, calculating an initial transmission amount on the basis of a maximum transmission amount used in a physical layer, and
    (d3) if the data transmission is not the first data transmission after establishing a session, determining a new transmission amount on the basis of an existing transmission amount.

2. The method of claim 1, wherein the busy channel state represents one of a state in which the node is sending or receiving data, a state in which channel access is delayed by an RTS (Request to Send) or a CTS (Clear To Send) of another node, or a state in which the node located in a signal detection range of another node cannot analyze a signal accurately, so that channel access is delayed by an EIFS (extended inter frame space), and
    wherein the idle channel state represents channel states other than the busy channel state.

3. The method of claim 1, wherein (c) comprises calculating the available bandwidth on the basis of the relation between a predetermined watch period during which the channel state is monitored and the amount of time monitored as the busy channel state during the watch period.

4. The method of claim 3, wherein the watch period denotes an interval between an instant at which the node acquires a channel during a backoff contention phase so as to staff RTS transmission and an instant at which after finishing the data transmission, the node acquires the next channel during another backoff contention phase.

5. The method of claim 1, wherein (d2) comprises dividing the maximum transmission amount by the number of sessions that the node establishes, and multiplying the result of dividing the maximum transmission amount by the number of sessions that the node establishes by the available bandwidth so as to determine an initial transmission amount.

6. The method of claim 1, wherein (d3) comprises determining a variation in the available bandwidths by comparing the present available bandwidth with an available bandwidth just prior to the present available bandwidth, and if the variation in the available bandwidths is greater than 0, increasing the transmission amount by as much as the variation increase, and if the variation in the available bandwidths is not greater than 0, decreasing the transmission amount by as much as the variation decrease.

7. An apparatus for controlling congestion of a node in an ad-hoc network, the apparatus comprising:
    a monitoring unit which classifies a channel state into a busy channel state or an idle channel state and then monitors the channel state;
    a channel contending unit which performs contention for acquiring a channel with neighboring nodes when data that is to be transmitted is present during the monitoring of the channel state;
    a bandwidth calculating unit which calculates an available bandwidth on the basis of the channel state when the node wins the contention; and
    a determining unit which determines an amount of data to be transmitted on the basis of the available bandwidth,
    wherein the determining unit comprises a first determining unit which determines an initial transmission amount by dividing a maximum transmission amount at a physical layer by the number of sessions that the node establishes and then multiplying the result of the division by the available bandwidth when data transmission is a first data transmission after establishing a session, and a second determining unit which determines a variation in the available bandwidths by comparing the present available bandwidth with an available bandwidth just prior to the present available bandwidth when data transmission is not the first data transmission after establishing a session.

8. The apparatus of claim 7, wherein the busy channel state represents one of a state in which the node is sending or receiving data, a state in which channel access is delayed by an RTS (Request to Send) or a CTS (Clear To Send) of another node, or a state in which the node located in a signal detection range of another node cannot analyze a signal accurately, so that channel access is delayed by an EIFS (extended inter frame space), and
    wherein the idle channel state represents channel states other than the busy channel state.

9. The apparatus of claim 7, wherein the bandwidth calculating unit calculates the available bandwidth on the basis of the relation between a predetermined watch period during which the channel state is monitored and the amount of time monitored as the busy channel state during the watch period.

10. A non-transitory tangible, computer-readable medium having embodied thereon a computer program for executing a method of controlling congestion of a node in an ad-hoc network, the method comprising: (a) classifying a channel state into a busy channel state or an idle channel state and then monitoring the channel state; (b) performing contention for acquiring a channel with neighboring nodes when data that is to be transmitted is present during the monitoring of the channel state; (c) calculating an available bandwidth on the basis of the channel state when the node wins the contention; and (d) determining an amount of data to be transmitted on the basis of the available bandwidth, wherein (d) comprises (d1) determining whether or not data transmission is a first data transmission after establishing a session, (d2) if the data transmission is the first data transmission after establishing a session, calculating an initial transmission amount on the basis of a maximum transmission amount used in a physical layer, and (d3) if the data transmission is not the first data transmission after establishing a session, determining a new transmission amount on the basis of an existing transmission amount.

11. A method of controlling congestion of a node in an ad-hoc network, the method comprising:
    classifying a channel state as a busy channel state or an idle channel state;
    monitoring the channel state after classifying the channel state;
    performing contention for acquiring a channel with neighboring nodes when data to be transmitted is present at the node during the monitoring of the channel state;
    calculating an available bandwidth on the basis of the channel state monitored; and
    determining an amount of data to be transmitted on the basis of the available bandwidth, the amount of data to be transmitted being a first data amount if the data transmission is a first transmission after establishing a session and a second data amount if the data transmission is not the first data transmission after establishing the session, the first and second data amounts being different from each other.

12. The method of claim 11, wherein the calculation step is performed if the node wins the contention.

13. The method of claim 11, wherein the determining step comprises:
    dividing the maximum transmission amount by the number of sessions that the node establishes, and
    multiplying a result the dividing step by the available bandwidth so as to determine an initial transmission amount.

14. The method of claim 11, wherein determining step comprises: determining a variation in the available bandwidths by comparing the present available bandwidth with an available bandwidth just prior to the present available bandwidth, and if the variation in the available bandwidths is greater than 0, increasing the transmission amount, if the variation in the available bandwidths is not greater than 0, decreasing the transmission amount.

15. The method of claim 14, wherein the transmission amount increased corresponds to an amount of increase in the variation, and the transmission amount decreased corresponds to an amount of decrease in the variation.

* * * * *